(12) United States Patent
Johnson et al.

(10) Patent No.: US 11,803,805 B2
(45) Date of Patent: Oct. 31, 2023

(54) SUPPLY CHAIN MANAGEMENT SYSTEM AND PLATFORM

(71) Applicant: Target Brands, Inc., Minneapolis, MN (US)

(72) Inventors: Daniel J. Johnson, Minneapolis, MN (US); Michael Rorro, Minneapolis, MN (US); Patrick McNeil, Minneapolis, MN (US); Roshan Choudhary, Minneapolis, MN (US); Ruchi Nema, Minneapolis, MN (US); Jaideep Shetty, Minneapolis, MN (US); Chinmay Jethwa, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 110 days.

(21) Appl. No.: 17/483,284

(22) Filed: Sep. 23, 2021

(65) Prior Publication Data
US 2023/0093180 A1     Mar. 23, 2023

(51) Int. Cl.
*G06Q 10/0833* (2023.01)
*G06Q 10/0631* (2023.01)
*G06Q 10/087* (2023.01)

(52) U.S. Cl.
CPC . *G06Q 10/0833* (2013.01); *G06Q 10/063114* (2013.01); *G06Q 10/087* (2013.01)

(58) Field of Classification Search
CPC ....... G06Q 10/0833; G06Q 10/063114; G06Q 10/087
USPC .................................................... 705/333
See application file for complete search history.

(56) References Cited

U.S. PATENT DOCUMENTS

| | | | |
|---|---|---|---|
| 7,136,832 B2 | 11/2006 | Li et al. | |
| 7,900,153 B2 | 3/2011 | Damodaran et al. | |
| 7,969,306 B2 | 6/2011 | Ebert et al. | |
| 8,050,956 B2 | 11/2011 | Abo-Hasna et al. | |
| 8,087,867 B2 | 1/2012 | Tian | |
| 8,949,147 B1 | 2/2015 | Chowdhury | |
| 9,171,277 B2 | 10/2015 | Rutt et al. | |
| 10,089,595 B2 | 10/2018 | Hoffmann | |
| 10,296,857 B2 | 5/2019 | Burrows et al. | |
| 10,515,332 B2 | 12/2019 | Bielefeldt et al. | |

(Continued)

OTHER PUBLICATIONS

"Supply Chain Management, Transport and the Environment A-Review" Published by Green logistics White Consortium Working Paper (Year: 2006).*

*Primary Examiner* — Zeina Elchanti
(74) *Attorney, Agent, or Firm* — Barnes & Thornburg LLP

(57) ABSTRACT

For each order in a supply chain, order details are accessed. A disposition of each load of each order, the disposition comprising a plurality of expected milestones and a plurality of actual milestones. Each load is identified as either completed or projected based on the disposition of the load. An inventory readiness metric for each load is determined based on the disposition of the load. An inventory readiness root cause for each load is determined based on the disposition of the load. Load data for each load is stored in a supply chain data store. The load data comprising the disposition of the load, the inventory readiness metric for the load, and the inventory readiness root cause for the load. Queries about the supply chain are responded to using the load data.

21 Claims, 12 Drawing Sheets

(56) References Cited

U.S. PATENT DOCUMENTS

| | | |
|---|---|---|
| 11,429,927 B1 * | 8/2022 | Melancon ............ G06Q 10/087 |
| 2005/0171856 A1 | 8/2005 | Takahashi et al. |
| 2005/0265083 A1 | 12/2005 | Perry |
| 2011/0050397 A1 | 3/2011 | Cova |
| 2011/0131201 A1 | 6/2011 | Lin |
| 2011/0230994 A1 | 9/2011 | Spearman |
| 2011/0251716 A1 | 10/2011 | Buzzoni et al. |
| 2012/0303498 A1 | 11/2012 | Cova et al. |
| 2014/0365258 A1 | 12/2014 | Vestal et al. |
| 2015/0046363 A1 | 2/2015 | McNamara et al. |
| 2015/0269517 A1 | 9/2015 | Berichon et al. |
| 2015/0269617 A1 | 9/2015 | Mikurak |
| 2015/0352721 A1 | 12/2015 | Wicks et al. |
| 2016/0110683 A1 | 4/2016 | Gupta et al. |
| 2016/0171441 A1 | 6/2016 | Lively et al. |
| 2018/0082183 A1 | 3/2018 | Hertz et al. |
| 2018/0094953 A1 | 4/2018 | Colson et al. |
| 2018/0300669 A1 | 10/2018 | Gabrielson |

* cited by examiner

SUPPLY CHAIN MANAGEMENT SYSTEM AND PLATFORM

TECHNICAL FIELD

This document generally relates to technology for supply chain management, including technology for tracking freight in transit through a supply chain.

BACKGROUND

Supply chains are, in general, complex networks through which goods are supplied from producers to retailers and, ultimately, consumers. For example, supply chains can involve many different producers that are generating products for distribution, each of which may emanate from multiple different production and/or distribution facilities. These products can be transported using any of a variety of carriers, such as trucks, railcars, and/or boats, and in many instances may involve using multiple different carriers as items are transported through the supply chain (e.g., boat for transport over ocean, rail to transport from port to distribution center, and truck from distribution center to retail store). Additionally, items may be processed through one or more distribution center before they ultimately are delivered to retail stores and/or directly to consumers. As a result, supply chains can generate large numbers of data records, such as data identifying items and carriers that are transporting the items.

Supply chain tracking and management systems have included features to simply present the data records associated with the supply chain. For example, supply chain management systems have provided users with the ability to view a current data record for an item in the supply chain as well as an ability to view a historical log of data records for the item.

SUMMARY

The disclosed technology is generally directed to supply chain management systems and platforms to better and more accurately track and assess the state of the supply chain, including determining inventory readiness metrics which indicate whether loads and orders are on schedule for delivery to distribution centers by a target date. The supply chain management systems and platforms build off of and uses inventory ready dates (IRD) for items in the supply chain, which can be the date on which items will arrive at and be available for distribution at a distribution center (e.g., inventory unloaded from truck and available within distribution center for redistribution to, for instance, retail store or direct customer shipment). The IRD can be a singular target date that different actors and users of the supply chain can unify around, such as buyers, suppliers, distributors, carriers, and retailers. Previously, these different actors may have each had their own target dates and deadlines, which may have looked at only their smaller portion of the supply chain without broader supply chain considerations. IRD can be a unified target date against which all actors within the supply chain can organize and unify their activities around, with the ultimate goal being the holistic improvement and satisfaction of the supply chain's objectives—to supply requested items to distributors and retailers to meet demand for the items. IRD can take into account each leg of the supply chain, combining logistics, inventory management, and field operations to ensure that the IRD is accurate.

The disclosed supply chain management systems and platforms can use the IRD to track the status of the supply chain and to identify which actors in the supply chain are responsible for generating IRD risk and for reducing IRD risk. For example, an actor that takes longer than expected can be identified as increasing IRD risk, while an actor that performs faster than expected can be identified as reducing IRD risk.

To provide these features, which help to provide improve tracking, management, and assessment of the supply chain, including understanding changes over time to the state of the supply chain (as well as identifying root-causes of IRD risk), the disclosed technology can use any of a variety of components, such as a load tracker which tracks the status of loads (e.g., trucks, trains) that are transporting goods to distribution centers; an order tracker which builds off of the load tracker to track the status of orders that are (often) being fulfilled across multiple loads; and user interface features that use the load tracker and the order tracker to visualize and assess the current status of the supply chain, including visualizing individual loads/orders as well as broader swaths of the supply chain. These components can track and assess supply chain features against IRDs, and these components can be combined to better determine, monitor, and assess the status of the supply chain.

In some implementations, a system can be used for the management of data. The system includes one or more processors; and computer-readable memory storing instructions that, when executed by the processors, cause the processors to perform operations. The operations can include for each order in a supply chain, accessing order details; determining a disposition of each load of each order, the disposition comprising a plurality of expected milestones and a plurality of actual milestones; identifying each load as either completed or projected based on the disposition of the load; determining an inventory readiness metric for each load based on the disposition of the load; determining an inventory readiness root cause for each load based on the disposition of the load; storing load data for each load in a supply chain data store, the load data comprising the disposition of the load, the inventory readiness metric for the load, and the inventory readiness root cause for the load; and responding to queries about the supply chain using the load data. Other systems, methods, computer-readable media, devices, and software may be used.

Implementations can include some, none, or all of the following features. The disposition of a particular load comprises, for each projected milestone, a corresponding supply-chain entity tasked with the projected milestone. Determining the inventory readiness root cause for the particular load based on the disposition of the particular load comprises: determining that the inventory readiness metric of the particular load is behind-schedule based on a comparison a most-recent actual milestone and a corresponding expected milestone; determining that an early actual milestone did not match a corresponding earlier expected milestone; and determining that the supply-chain entity tasked with the corresponding earlier expected milestone is at least partly responsible for the inventory readiness root cause. Determining the inventory readiness root cause for the particular load based on the disposition of the particular load comprises: determining that the inventory readiness metric of the particular load is on-time based on a comparison a most-recent actual milestone and a corresponding expected milestone; determining that an early actual milestone did not match a corresponding earlier expected milestone; and determining that the supply-chain entity tasked with the corresponding earlier expected milestone is at least partly responsible for the inventory readiness root cause. Determining that the inventory readiness root cause for the particular load based on the disposition of the particular load comprises determining that a second supply-chain entity is responsible for returning the load's inventory readiness metric to on-time. Determining that the inventory readiness root cause for the particular load based on the disposition of the particular load comprises determining that a third supply-chain entity is also at least partly responsible for the inventory readiness root cause.

The systems, devices, program products, and processes described throughout this document can, in some instances, provide one or more of the following advantages. For example, given the magnitude of supply chain data, it can be challenging to determine the current status and state of the supply chain (e.g., on track, behind schedule, ahead of schedule). The disclosed technology provides improved solutions, over convention supply chain management systems and platforms, in that it is able to simplify this problem and provide a comprehensive solution that can permit for tracking and assessing the supply chain at a variety of different levels of granularity (e.g., load level, distribution center level, retail store department level). For instance, through the use of load tracking and order tracking, which can build on load tracking results, can be used to generate inventory readiness metrics (e.g., ahead of schedule, behind schedule, on track relative to IRD) across multiple different dimensions, including across loads (e.g., trucks, boats, trains) and across orders (e.g., purchase order placed with vendors).

In another example, the disclosed technology can improve supply chain management. For instance, complex orders made of hundreds, thousands, or millions of items can be tracked to create metrics that are far more simple than the raw tracking data, while still providing a viewer with enough information to understand the status of the order. This technology can be used for orders that will be supplied from many sources, to be sent to many destinations, by many different types of cargo haulers.

DESCRIPTION OF DRAWINGS

Like reference symbols in the various drawings indicate like elements

DETAILED DESCRIPTION

As described above, this document describes a technology platform for accurate tacking and assessing of the state of the supply chain, including whether loads and the orders they are on schedule for delivery to distribution centers. This technology uses an inventory ready date (IRD) as a key target for inventory shipped to destinations by the supply chain. From the IRD, various other milestone dates can be calculated. Then, orders consisting of hundreds, thousands, or millions of items are created to meet the IRD. From this, intermediate deadlines are created that, if met, make meeting the IRD likely. Metrics can be generated and displayed based on the items meeting or not meeting the deadlines created by this system. When IRDs are at risk or missed, root-cause analysis can be performed to identify which part of the complex supply chain was a root cause of the issue. Across a supply chain, the various contributors of various root-causes of IRD risk can be aggregated in order to assess average contribution to IRD risk.

Figure 1:
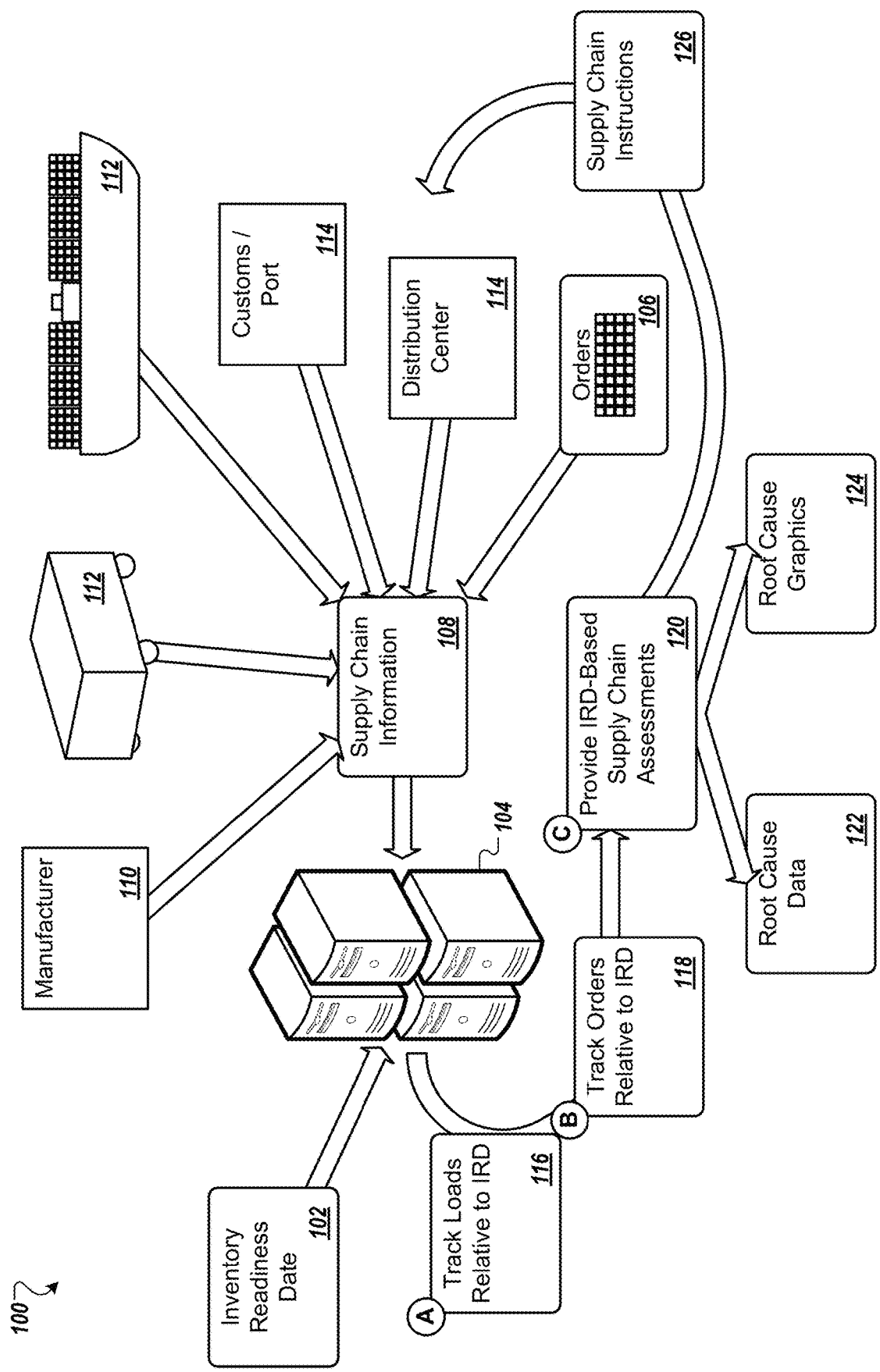
FIG. 1 shows a diagram of a system for generating inventory readiness metrics.

FIG. 1 shows a diagram of a system 100 for generating inventory readiness metrics. In general, an IRD 102 represents the date at which items ordered in a single order should be ready for use in a warehouse, distribution center, store, or other end location. This IRD 102 may be different, and later, than the day the items arrive at the distribution center. For example, if it takes 24 hours to unload a truck, unpack boxes, open containers, etc., before the item is sitting on the shelf ready to be accessed, the IRD 102 may be one day later than the day that the item should arrive in the truck at the distribution center.

A supply chain management computer system 104 can receive information for one or more orders 106. The orders 106 may each specify a collection of information. For example, the orders 106 may specify a list of items, a destination for each item (e.g., various stores, distribution centers), a source for each item (e.g., a factory, manufacturer, or other source of the item), price information, and/or handling information (e.g., weight, size, compatible containers). Each order 106 may be matched to an inventory readiness date 102. In this way, a large, multi-facility enterprise may be able to create complex, multi-item, multi-facility orders in a unified process.

To monitor the status of the order (e.g., to help a user understand if the manufacturers and suppliers are shipping the ordered items), the supply chain management computer system 104 can receive supply chain information 108 that contains information about the supply chain that is used to complete the orders 106. For example, the supply chain information 108 can include reporting data from manufacturers 110, including estimated and actual dates of manufacture, dates of shipment, etc. The supply chain information 108 can include reporting data for containers 112, including railcars, container trucks, ships, etc. The reporting data for containers 112 can include scheduling information, location tracking information, route information, etc. The supply chain information 108 can include reporting data from intermediate locations 114, including customs, ports, and distribution centers. In general, these intermediate locations can include locations where items, or containers holding the items, are temporarily held when in transit from their source (e.g., a manufacturer) to their destination (e.g., a fulfilment center). In some cases, the computer system 104 can filter, decorate, or otherwise alter the supply chain information 108 on receipt. For example, a large enterprise may generate a very large amount of data. Of this data, only a portion may be needed, and the unneeded portions may be filtered out. Similarly, the computer system 104 may decorate incoming supply chain information 108. For example, geolocation information may be decorated with the state or country in which the location resides.

The received information may be structured in the form of data events that each record a physical event that occurs in the supply chain. For example, a load arriving at a destination may create an event, a GPS location heartbeat message may be an event, etc. These events may be listened to by various components of the computer system 104 and, upon receipt of a new event, may launch one or more of the processes described in this document. In some cases, events may cause the update to data related to an order or load (e.g., updating location, IRD risk, or other data).

The supply chain management computer system 104 can use the received information 102, and 108 to track loads 116 relative to the IRDs 102. For example, a load in a truck may contain items for five different orders 106. The supply chain management computer system 104 may determine, for each of those five orders, if the truck's estimated arrival date will make that order's items on time, early, or late. The truck may have an estimated arrival date supplied by the trucking company, but this estimated arrival date may be different from the dates needed for IRDs 102 to be on time. For example, a delay up-stream of the shipping at the manufacturer 110 may make an IRD 102 in danger of being missed, even if the shipping by truck is done in an appropriate time. In such a way, a truck may be "on time" according to the trucking company, but the items in the truck may be "on time", "early", or "late" according to the IRDs 102. By separating the analysis of a carrier's performance with IRD risk, different and more useful information can be generated by the system. For example, a carrier that happens to receive loads late through no fault of their own (e.g., they service a port that has been experiencing bad weather, delaying unloading of boats) can be seen as performing well even if their loads have high IRD risk. Similarly, a carrier that often has unexpected delays but carries loads with low IRD risk may be seen as performing poorly.

The supply chain management computer system 104 can track 118 orders relative to IRDs 102. For example, with the status of each item in a load relative to IRD 102 known, the supply chain management computer system 104 can aggregate the IRD status of items in a single order across containers. This can include items from multiple sources being shipped to multiple destinations. In such a case, the breakdown of IRD status may not be a single number or value, but may instead be a multi-factor distribution of values. For example, 92% of items in an order may be on time, 5% may be early, and 3% may be late. This may be caused by most trucks carrying the items to different distribution centers carrying on-time items, two trucks carrying moving ahead of schedule, and one truck carrying items being delayed.

The supply chain management computer system 104 can provide 120 IRD-based supply chain assessments. For example, the supply chain management computer system 104 can generate one or more computer screens in the form of HTML, web pages, application interfaces, or static reports that report the status of root causes of IRD risk 122, graphic elements 124 related to IRD risk, or in other formats. In addition, the computer system 104 can also use the IRD-based supply chain assessments to update and improve the operations of the supply chain. For example, one or more computer-readable instructions 126 can be generated in order to implement, modify, cancel, and/or otherwise perform various supply chain operations by supply chain actors, such as manufacturers 110, carriers transporting containers 112, distribution centers and ports 114, purchase ordering systems 106, retail stores, and/or other systems and actors that are part of a supply chain. For example, the supply chain assessment 120 can be used to generate supply chain instructions 126 to send to a carrier 112 and/or intermediate location (e.g., port 114, distribution center 114) to expedite a particular load that has many items with high IRD risk. These instructions may be automatically generated and configured to cause one or more systems (e.g., automated systems, a package handling system, truck dispatch system) to perform one or more actions that can reduce the overall IRD risk of the supply chain.

Figure 2:
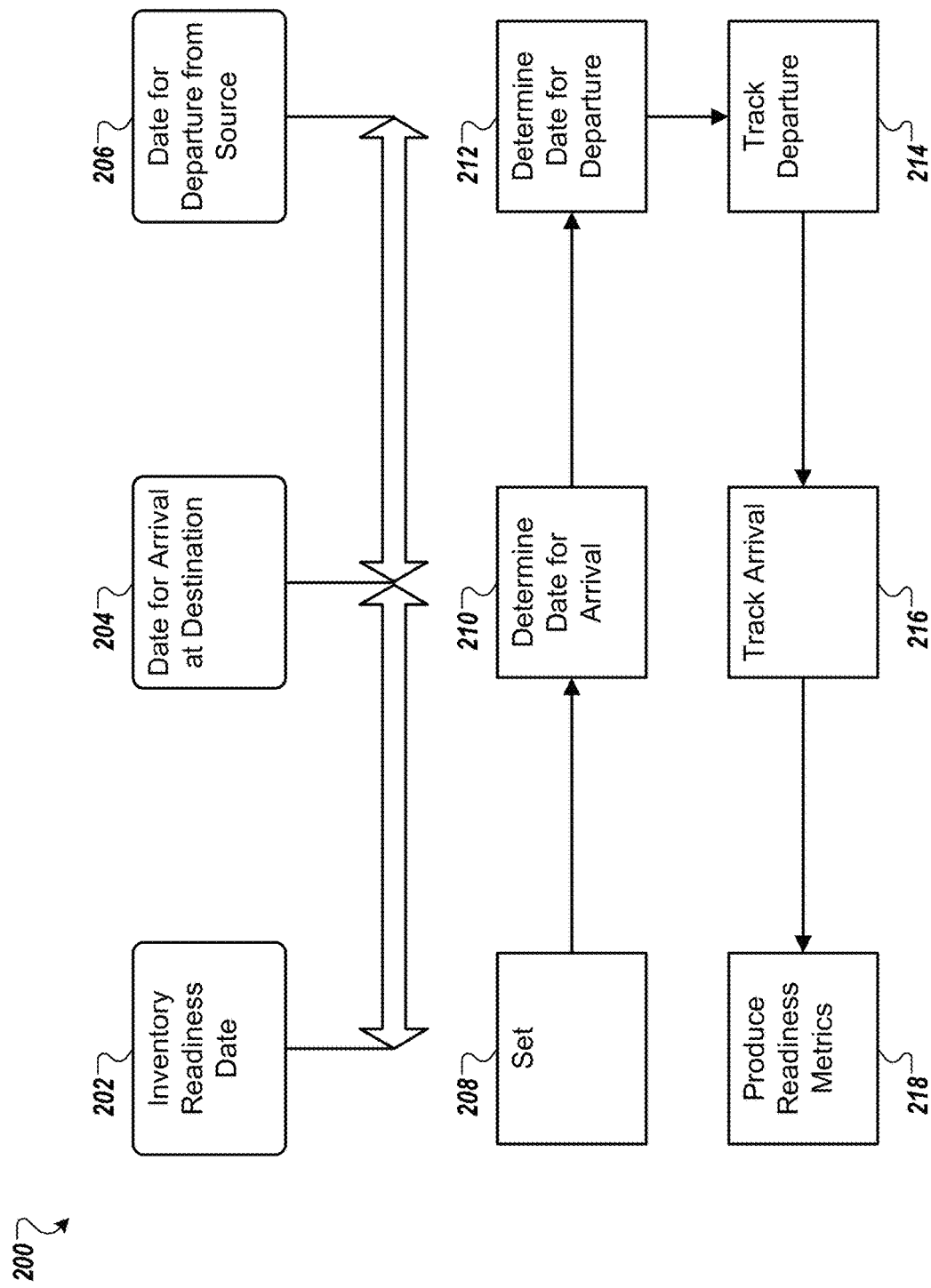
FIG. 2 shows a flowchart of a process of generating inventory readiness metrics.

FIG. 2 shows a flowchart of a process 200 of generating inventory readiness metrics. In the process 200, an IRD 102 is set 208, and then from there intermediate dates are determined based on various factors of the supply chain. In general, these intermediate dates act as benchmarks to aid in the evaluation of IRDs 102—if the intermediate dates are being met, the order is likely on time, and if the intermediate dates are not being met, the order is likely to be late.

One intermediate date can be a date for arrival at destination 204, which may include a distribution center, a store, etc. As previously explained, the item may not be ready for use when it initially arrives at its destination. It may need to be unloaded, unpacked, inspected, assembled, and placed on a shelf, etc., before it is available for use. This process may take a significant enough amount of time that i) the process may impact the IRD if it goes slower than normal and ii) the process may be abstracted away without impacting the accuracy of the IRD analysis. For example, an item traveling down a two foot ramp from the back of a shelf to the front may take seconds and be fast enough to not need accounted for, but the unpacking discussed here may involve hours or days of work from arrival at the destination.

One intermediate date can be a date of departure from the item's source 206. This source may in some cases be the location where the item is manufactured, mined, generated, or assembled. In some cases, the source may be the first point at which the supply chain is automatically monitored. For example, a supplier of raw materials may not provide detailed, electronic tracking information until the raw materials arrive at the customs-controlled port where the material is being exported. In such a case, the customs-controlled port may be the source of the item, even if it is hundreds of miles from where the raw material is grown, extracted, manufactured, etc.

Two intermediate dates are shown here, but other intermediate dates can be used, including more or fewer dates. For example, if the items must from the source by rail car, then by ship, then by truck before arrival at the destination, additional intermediate dates may be used to represent the transition from rail to ship, and from ship to truck, as well as additional intermediate dates within each of those modes of transit (e.g., intermediate date for carrier reaching one or more intermediate locations and/or progress points). Additional and/or alternative intermediate dates can include stops in which some, but not all, of a load are unloaded or loaded. For example, a truck may have a load with items destined for two different retail stores, and each arrival and departure from the two retail stores may also have an intermediate date.

An IRD is set 208. For example, a computer system can receive, from outside of the computer system, input that specifies and IRD. This input may take the form of user input entering the data through a graphical user interface (GUI). This input may take the form of a data message transmitted over a data network. The receiving computer system can, using the input, store the IRD to computer memory to specify a first calendar date on which an order of items should be ready at each items' respective destination location. In some cases, the IRD is received as part of input that specifies the order for the computer system.

An arrival date is determined for each item of the order 210. For example, the computer system may access data for each item of the order and identify a destination for that item. For example, the order may specify one million identical items, with ten thousand items being ordered for each of one hundred distribution centers located across a country. Each distribution may have recorded the number of days that the center normally takes to unload and make ready such items—one day, two days, or three days. As such, the computer system may determine arrival dates 204 for each distribution center that are one day, two days, or three days before the IRD 202. As such, for each item of the order, an arrival date is set before the readiness date, the arrival date specifying a second calendar date on which the item should arrive at the item's respective destination location.

A departure date is determined for each item of the order 212. For example, the computer system may access data for each item of the order and identify a source for that item. For example, the items may be shipped from one of three factories spread across the country. Given the source of the item along with the destination now, the computer system can determine a length of time needed to transport the item from the source to the destination. Working backwards from the arrival date 204, the computer system can determine a departure date before the arrival date, the departure date specifying a third calendar date on which the item should depart the item's respective source location. For example, if a particular item has an IRD 202 of Friday, an arrival date 204 of Thursday, and requires two days to transit from the source to the destination, a departure date of Tuesday may be determined.

In some cases, determining, for each item of the order, an arrival date and determining, for each item of the order, a departure date, comprises querying a user for the second calendar date and the third calendar date. For example, the computer system may generate one or more GUIs to provide a user with an order specification screen. The user may input, into the screen, details about the order. This can include the IRD, the arrival date 204, and the departure date. In some implementations, this information may be generated based on secondary considerations input by the user. For example, the user may specify an IRD 202 and request arrival dates and departure dates calculated to reduce transit costs, time in transit, storage overhead, etc. In another example, the user may enter the departure date, as that may be inflexibly set by the manufacturer, and from there the GUI may guide the user to select other aspects of the order (e.g., shipping method or IRD), and the system may proposed values given those inputs (e.g., providing an IRD given the shipping method, providing a recommended shipping method given the IRD).

Events such as departure events are tracked 214 and arrival events are tracked 216. For example, as the items move through the supply chain, the computer system may receive tracking updates of such movement and identify transit events (e.g., departure events, arrival events). Based on these events, the computer system can keep up-to-date of location data for each item. In addition, estimates of future arrivals and/or departures can be updated based on the new information, and these projections can be compared against IRD to determine the risk level for various items (e.g., high risk of item missing IRD based on projected arrival date). For example, if a load arrives to one destination a day early, projected future arrivals and departures may be adjusted by one day to reflect this updated understanding of load status, which can additionally update the IRD-based status of the items contained with the load.

In some cases, this process can include receiving tracking data from a plurality of shipping containers, each shipping container containing at least one of the items. These shipping containers can include vehicles such as trucks, rail cars, and ships that may have global positioning data (GPS) or route data reported. These shipping containers can include boxes, bins, bags, or pallets that include bar codes, wireless data tags, or other technology used to generate tracking information. As the various types of shipping have different real-world capabilities and options (e.g., trucks can unload at a store, but boats are unlikely to) data for each type of container can be configured to reflect those real world capabilities and options. As such, data for different containers may be handled differently by the systems.

Readiness metrics are produced 218. For example, for each item of the order discussed in this example, the computer system can generate an inventory readiness metric based on the item's travel based on tracking data for the item as the item travels from the item's respective source location to the respective destination location. For example, the computer system can compare actual departure events and actual arrival events to the planned arrival date 204 and the planned departure date 206.

In one example, items that actually depart or arrive before their planned dates can be tagged as "ahead of schedule", items that actually depart or arrive on their planned dates can be tagged as "on schedule", and items that actually depart or arrive after their planned dates can be tagged as "behind schedule." In another example, the metric can report a risk of being behind schedule. Items with actual dates ahead of or on the planned dates can be tagged as low risk, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

As tracking events are received, the computer system can continually update the IRD metrics. For example, a particular item may have an actual departure date matching the planned departure date 206. The rail car carrying the item may be delayed in transit, taking four days to travel instead of the planned two, resulting in an actual arrival date that is two days after the planned arrival date 204. In such a case, the item may initially be given an "on time", "green" or otherwise favorable IRD metric. However, when the arrival date lapses (or when another intermediate date lapses), the computer system can update the readiness metric for that item to "late", "red", or otherwise unfavorable.

Figure 3:
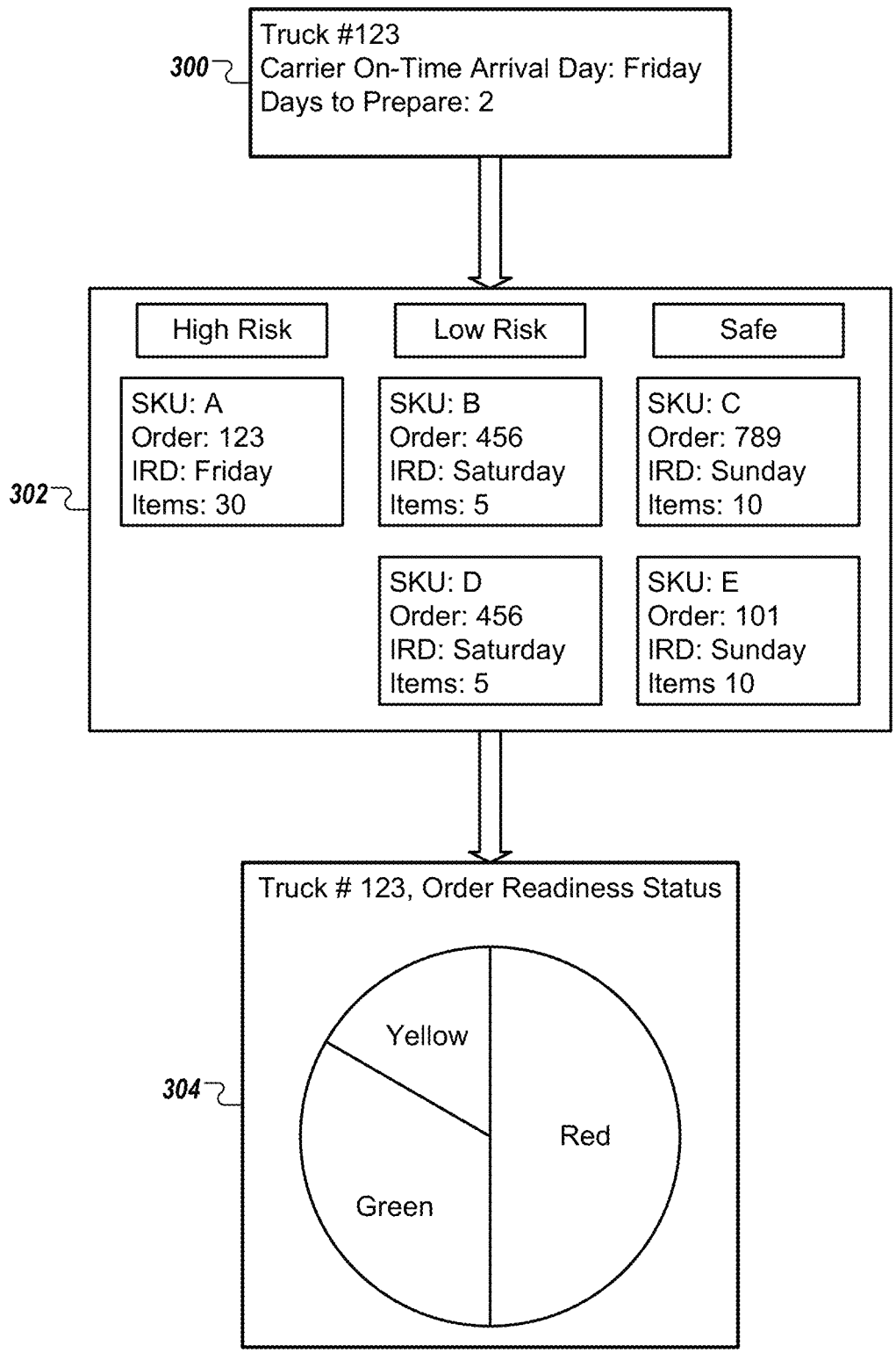
FIGS. 3 and 4 show schematic diagrams of an example readiness metric.

FIG. 3 shows a schematic diagram of an example readiness metric. In this example, the metric can report a risk of being behind schedule. Items with actual dates ahead of or on the planned dates can be tagged as a "safe" risk level, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

Data 300 can be stored by a computer system to record data related to a container that is used to ship items for an order. For example, items for the order may be recorded as in transit on truck #123. The carrier may have a carrier-scheduled on-time arrival date of Friday. However, as explained above, this date may be different from the IRD or other intermediate dates used to determine IRD metrics. In addition, the data 300 can record the number of days needed to unpack and make ready the items once they reach their destination.

Data 302 can be stored by the computer system to maintain the IRD status of items in the truck #123. In this example, the truck is carrying a total of 60 items across five Stock Keeping Units (SKUs). These 60 items are each assigned to one of four orders, but have been shipped in the truck #123 to enhance overall efficiency of the supply chain. Because they are part of different orders, they may have assigned different IRDs. As such, items from the same truck—a truck that the carrier identifies as "on time"—can nevertheless have different IRD metrics. In this case, items with an IRD of Friday are more than a day behind schedule and marked as "high risk", items a day behind schedule are marked as "at risk", while items on schedule are marked as "safe".

Report 304 reports the risk status of the items in the truck in the form of a multi-factor metric that represents the inventory readiness metric of each item contained by the container. Of note, the pie chart of the report 304 reports risk weighted by item count, not by SKU. So while there are five SKUs in the truck, one SKU contains half of the items and those items are at risk. As such, the pie chart shows half of the area marked "red" for "high risk". Similarly, "low risk" and "safe" have the same number of SKUs but different numbers of items, and thus the "yellow" and "green" areas are of unequal size.

The report 304 may be displayed to a user on a screen, by being printed on paper, etc. With this information, the user can quickly identify the status of the items in the truck and determine if any remedial action should be taken. For example, as this report contains large amounts of red followed by yellow, the user may identify it as a high-priority for redial action. As such, the user may generate an order for the supply chain to expedite the truck #123.

Figure 4:
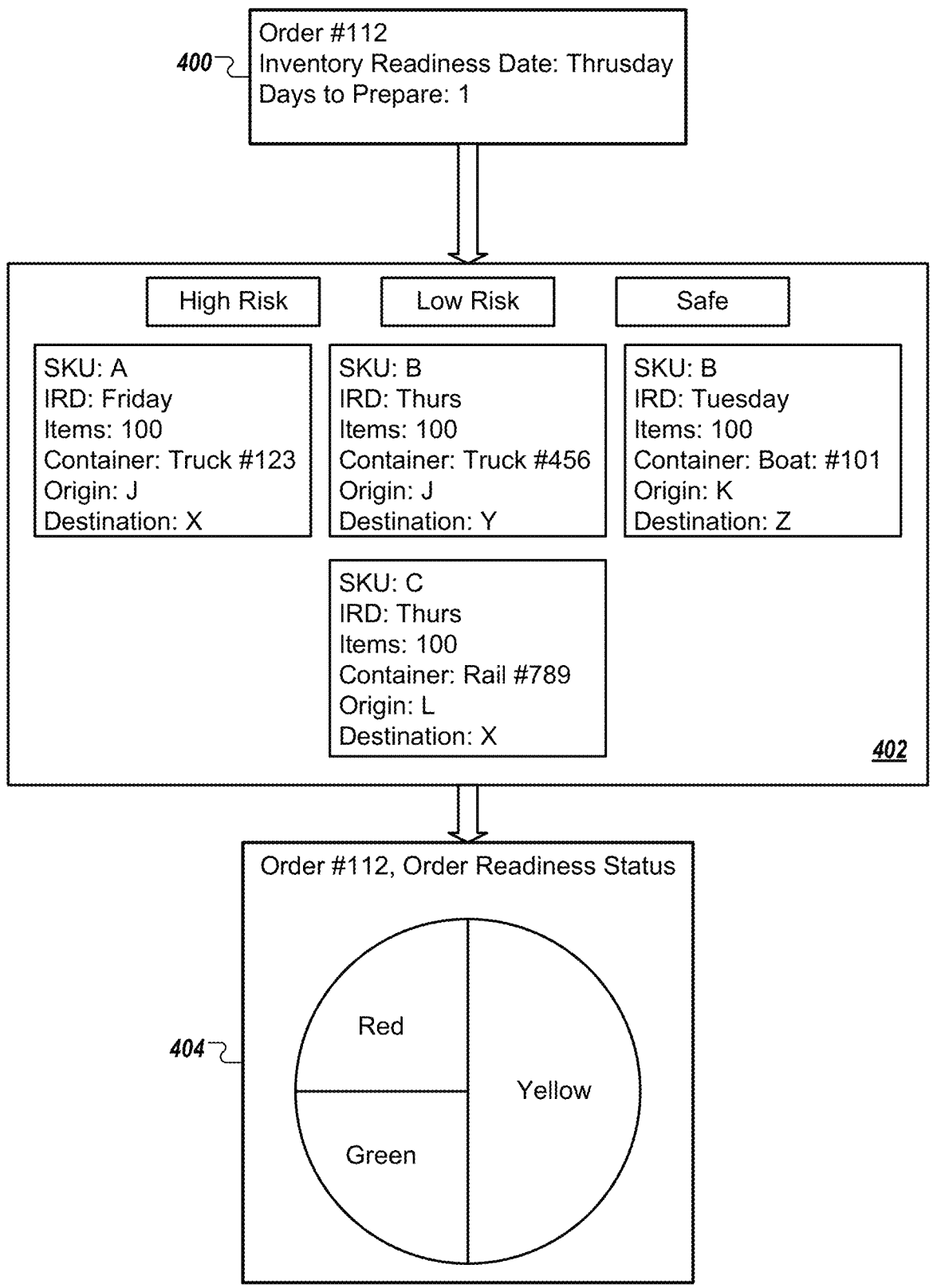

FIG. 4 shows a schematic diagram of an example readiness metric. In this example, the metric can report a risk of being behind schedule. Items with actual dates ahead of or on the planned dates can be tagged as a "safe" risk level, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

Data 400 can be stored by a computer system to record data related to items for an order across many containers. For example, items for the order #112 may be recorded with associated metadata. For example, the data 400 can record the IRD for an order and number of days needed to unpack and make ready the items once they reach their destination.

Data 402 can be stored by the computer system to maintain a projected arrival date of items in the order #112. In this example, 400 items are being transported from various sources, to various destinations, as grouped together by three different SKUs of items (A, B, and C) being transported from three different origin locations (J, K, and L) to three different destinations (X, Y, and Z across four different containers, truck #123, truck #456, rail car #789, and boat #101. In addition, orders with different SKUs can have different IRDs to the same location. For example, SKU A may have an IRD of Thursday and SKU B may have an IRD on a different day (e.g., Friday). As depicted by the combinations of SKU, source location, destination location, and containers that are part of order #112, an order can include multiple different items (e.g., SKUs A, B, and C) that are fulfilled from multiple different source locations (e.g., origins J, K, and L) to multiple different destination locations (e.g., destinations X, Y, and Z) using multiple different carriers (e.g., truck #123, truck #456, rail car #789, and boat #101). Due to this complexity, simply tracking the progress of each of portion of an order is a challenge, let alone the added difficulty in assessing the overall and current IRD-based risk of the order (and its component parts) being unavailable across all of these different moving parts (e.g., different SKUs, source locations, destinations, containers). For example, because each items that is part of the order (represented by SKUs) may be at different points in its transit path, they may have assigned different statuses. As items transition along their transit path, which may include being transferred between different containers, the status of the items and their projection relative to IRD can be updated (e.g., events identifying progress of items can be received and used to update IRD-based status for items). As such, items set to arrive at least a day before the IRD are set to "safe", items set to arrive on the IRD date are marked "low risk", and items arriving after the IRD date are marked as "high risk". Other rating schemes may be used.

Report 404 reports the risk status of items in the order in the form of a first multi-factor metric that represents the inventory readiness metric of each item of the order. Of note, the pie chart of the report 404 reports risk weighted by item count, not by container. However, in this case, each container contains the same number of items, so the size of each section of the chart happens to correlate to the number of containers in each risk category.

The report 404 may be displayed to a user on a screen, by being printed on paper, etc. With this information, the user can quickly identify the status of the items in the order and determine if any remedial action should be taken. For example, as this report contains large amounts of red followed by yellow, the user may identify it as a high-priority for redial action. As such, the user may generate an order for the supply chain to temporarily halt activities that use many of the items in the order #112.

Figure 5:
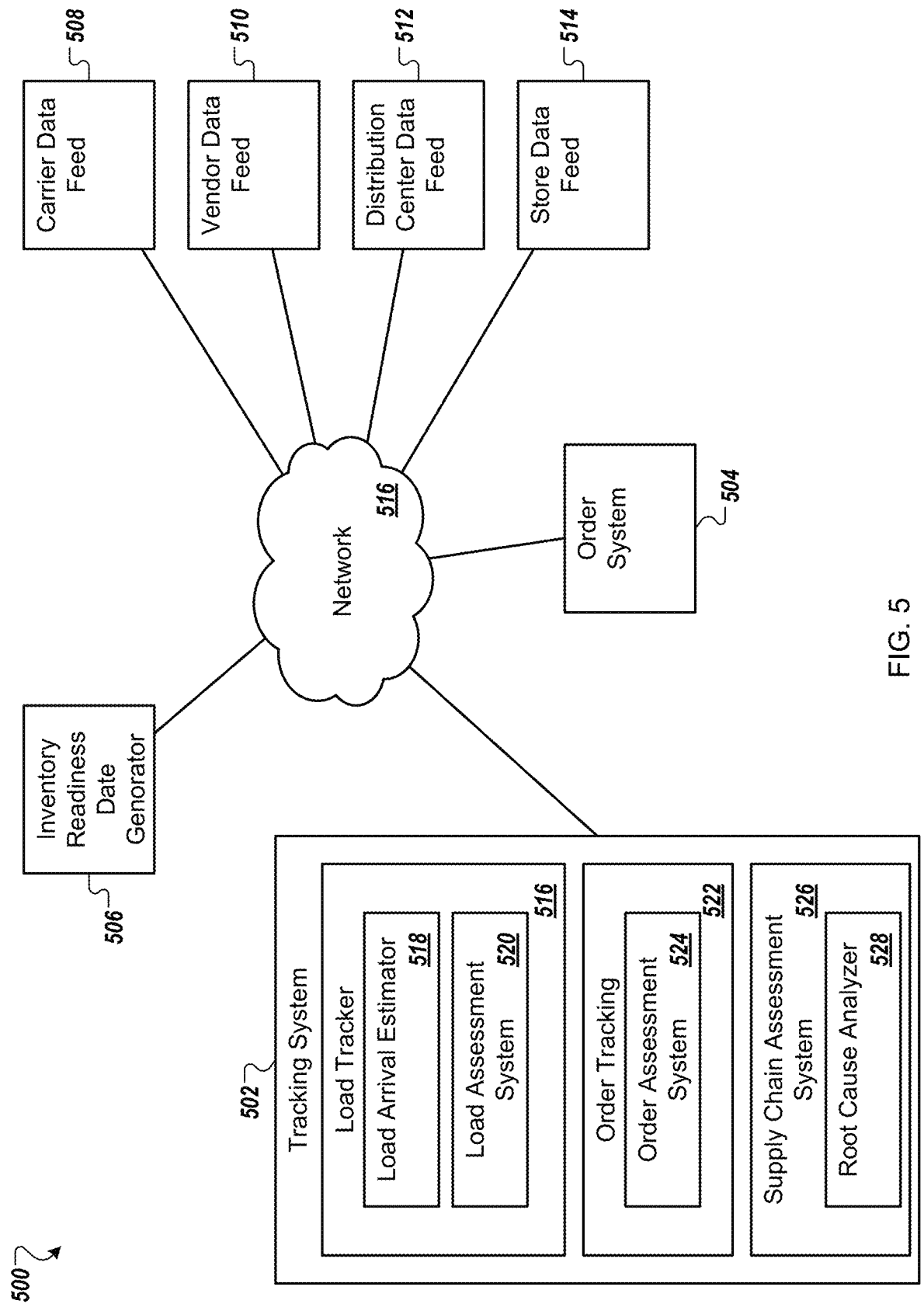
FIG. 5 shows a diagram of a system for generating inventory readiness metrics.

FIG. 5 shows a diagram of a system 500 that includes computer devices that operate to generate inventory readiness metrics. In the system 500, a tracking system 502 can receive data from other elements of the system 500 and can generate new data to report on the status of the supply chain. For example, an order system 504 can report, to the tracking system 502, details about orders that are to be fulfilled using the supply chain. This order information can include a listing of items in the order, sources for the items, destinations for the items, etc. An inventory readiness date generator 506 can generate, from the order information and other data in the system 500, inventory readiness dates for the orders.

Various data feeds can supply data to the tracking system 502 on an ongoing basis. A carrier data feed 508 can supply the tracking system 502 with carrier tracking data. This data can include shipping events (e.g., departure from a particular location by a particular container), status data (e.g., geolocation data, speed, direction, fuel status), and carrier-based-status values (e.g., on time, ahead of schedule, or late, according to carrier quality of service agreements).

A vendor data feed 510 can supply the tracking system 502 with vendor tracking data. This data can include vendor events (e.g., sale of items that are ordered), status data (e.g., where items are in the manufacturing process), and vendor-based-status values (e.g., if the manufacturing process is on time, ahead of schedule, or late, according to vendor contracts). A distribution center data feed 512 can supply the tracking system 502 with distribution center tracking data. This data can include information about the status of items in the distribution center (e.g., including both items that were ordered as part of the orders discussed above and items not ordered as discussed), and the capabilities of the distribution center (e.g., time to unload items, ability to sort and assemble parts). A store data feed 514 can supply the tracking system 502 with store tracking data. This data can include information about the status of items arriving and for sale at stores, and the capabilities of the stores (e.g., time to unload items, ability to sort and assemble parts).

A network 516 can provide data communication between elements of the system 500. For example, the data network can create, maintain, and tear down data connections that allow messages to be sent by one element and received by another element. The network 516 can include the Internet, private networks, public networks, etc.

The tracking system 502 can include a load tracker 516 that is able to execute operations to track loads of items. For example, the load tracker 516 may maintain, in computer memory, a list of loads in containers. This list of containers can also include, for each container, a list of items in the load, the order number of the items, the locations of the containers, etc. A load arrival estimator 518 can execute operations to estimate arrival times of loads. For example, the load estimator 518 may maintain, in computer memory, a list of planned arrival dates (e.g., arrival dates 204) for each load being tracked. The load estimator 518 may also store other data to determine if the loads being tracked are likely to meet their planned arrival dates. For example, this data may include intermediate benchmarks, geolocation data, travel velocity, traffic data, weather data, etc. This other data may be submitted to a classifier to identify one or more likely arrival dates.

A load assessment system 520 may submit this other data (e.g., the intermediate benchmarks, geolocation data, travel velocity, traffic data, weather data, etc.) to one or more classifier functions that return one or more estimated arrival dates, given the input. This estimated date may take the form of a single date estimated to be the most likely, a plurality of dates each having an associated confidence value, etc.

The tracking system 502 can include an order tracking system 522 that is able to execute operations to track orders of items. For example, the order tracker may maintain, in computer memory, a list of orders of items. This list of orders can also include, for each order, a list of containers containing items of the order, SKUs of the items, etc. A order assessment system 524 may submit data received from the load tracker 516 (e.g., estimated arrival times) to one or more classifier functions that return one or more order risk scores that report the risk each item of the order has of missing its assigned IRD.

A supply chain assessment system 526 of the tracking system 502 can generate assessments of the supply chain. For example, the system 526 can generate the screens 112 and 124, the report 304, and or the report 404. A root cause analyzer 528 can analyze current and historic IRD risk to determine root causes of such risks.

Figure 6:
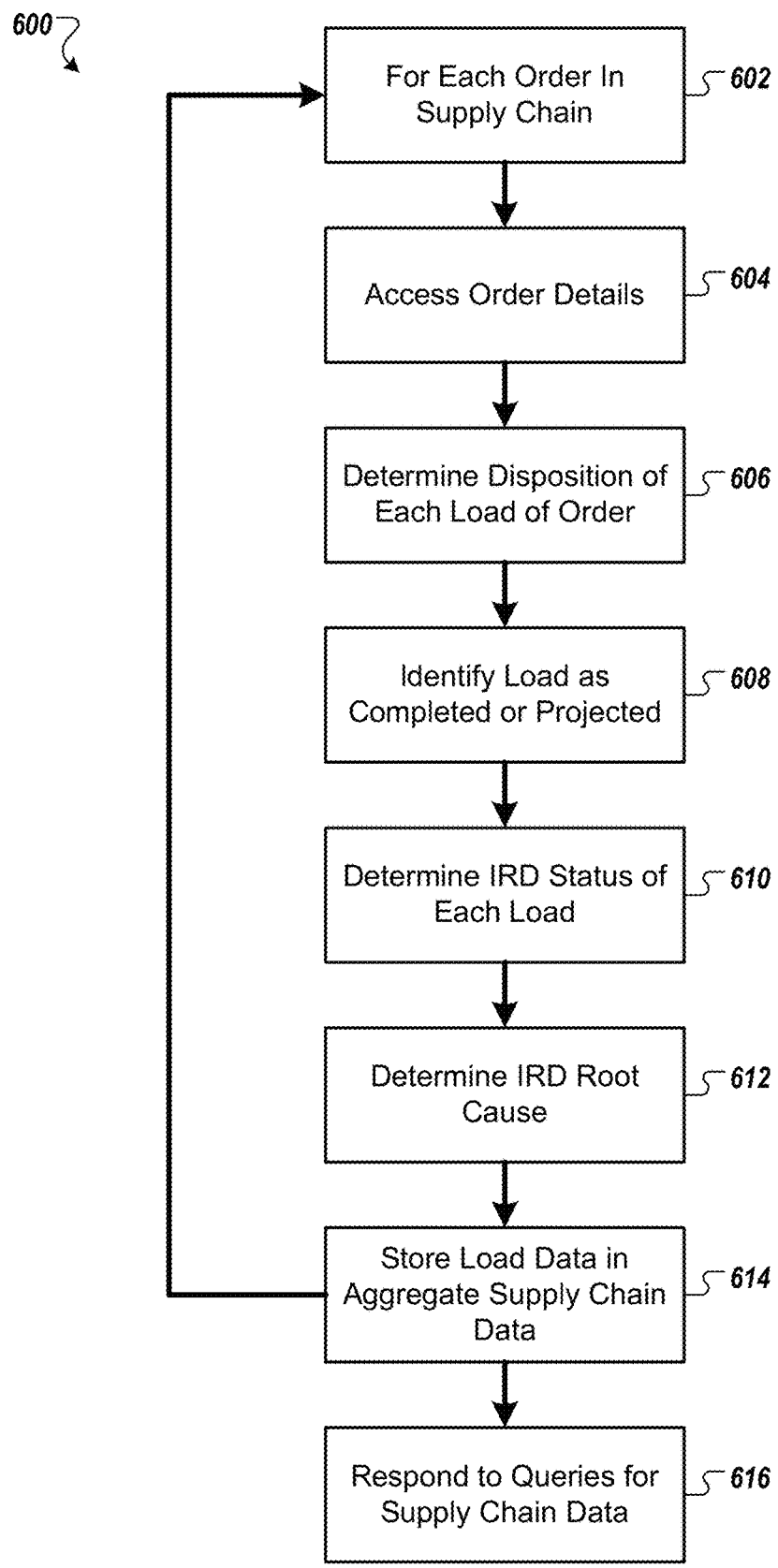
FIG. 6 shows a flowchart of a process for generating root-cause data for a supply chain.

FIG. 6 shows a flowchart of a process 600 for generating root-cause data for a supply chain. The process 600 can be performed by, for example, the system 500 using the root cause analyzer 528 and will be used as the basis of an example. Hover other elements may be used to perform the process 600 or other similar processes.

The process 600 is repeated 602 for each item in a supply chain. For example, a supply chain servicing dozens of distribution centers and hundreds or thousands of retails stores may have, at any one time, tens of thousands to hundreds of millions of active and recent orders. The process 600 can be performed to analyze each order, including by performing analysis in parallel, in sequence, or according to other schemes such as periodically, concurrently, continuously, etc.

Order details are accessed 604. For example, a single order is identified (e.g., by unique identifier) by the root cause analyzer 528. For example, the root cause analyzer 528 can iterate through a list of all orders and select the next unselected order to access the next order's order details.

Disposition of each load of the order is determined 606. For example, an order can include shipments from multiple vendors, to multiple endpoints, etc. As such, a single order may require multiple loads to complete. However, in some other cases, a single order may include only a single load.

The disposition information that is determined can include a plurality of expected milestones and a plurality of actual milestones. The expected milestones, for example, may be created by the load arrival estimator 518 based on a required IRD, based on the first date available from the vendor, etc. These expected milestones are future dates on which a particular event is planned to occur. The actual milestones, on the other hand, are records of what actually happened in the supply chain. For example, the load assessment system 520 can monitor tracking data, barcode scans, etc. to determine when the events actually took place.

The disposition of a particular load comprises, for each projected milestone, a corresponding supply-chain entity tasked with the projected milestone. For example, a vendor can be tasked with supplying goods on a particular date or dates. A shipper can be tasked with hauling a load from a source to a destination. A distribution center can be tasked with putting away a load from the receiving dock. Other supply chain entities can be tasked with these or other tasks, depending on the particular configuration of the supply chain.

Each load is identified as either completed or projected 608. For example, the load assessment system 520 can use the disposition of the load to determine if it is completed by reading the most recent actual milestone. If the most recent actual milestone is a terminal milestone (e.g., put away in a distribution center, supplied to an aid station, distributed to waiting customers), the load assessment system 520 can identify the load as completed. If the most recent actual milestone is not a terminal milestone, the load assessment system 520 identify the load as projected to be completed in the future.

IRD status of each load is determined 610. For example, based on the disposition of the load, and by comparing the expected milestones for the load against the actual milestones for the load, the load assessment system can determine the IRD status of the load. Example IRD status include "ahead", "on time", "behind schedule", and "critically behind schedule'. Example IRD status can include a time such as the seconds, minutes, or hours behind or ahead of the IRD schedule the load is.

IRD root cause is determined for each load 612. For example, using the disposition of the load, the root cause analyzer can determine one or more root causes for the IRD status. This may include identifying one or more supply chain entities that caused delays, and may also include one or more supply chain entities that performed above original projection in order to reduce IRD risk and improve IRD status.

Load data is stored in an aggregate supply chain data store 614. For example, the load data can include the disposition of the load, the inventory readiness metric for the load, and the inventory readiness root cause for the load. This data store can merge this load data with other stored load data in order to keep an up-to-date record of IRD-related information accessible in a single interface.

Figure 7:
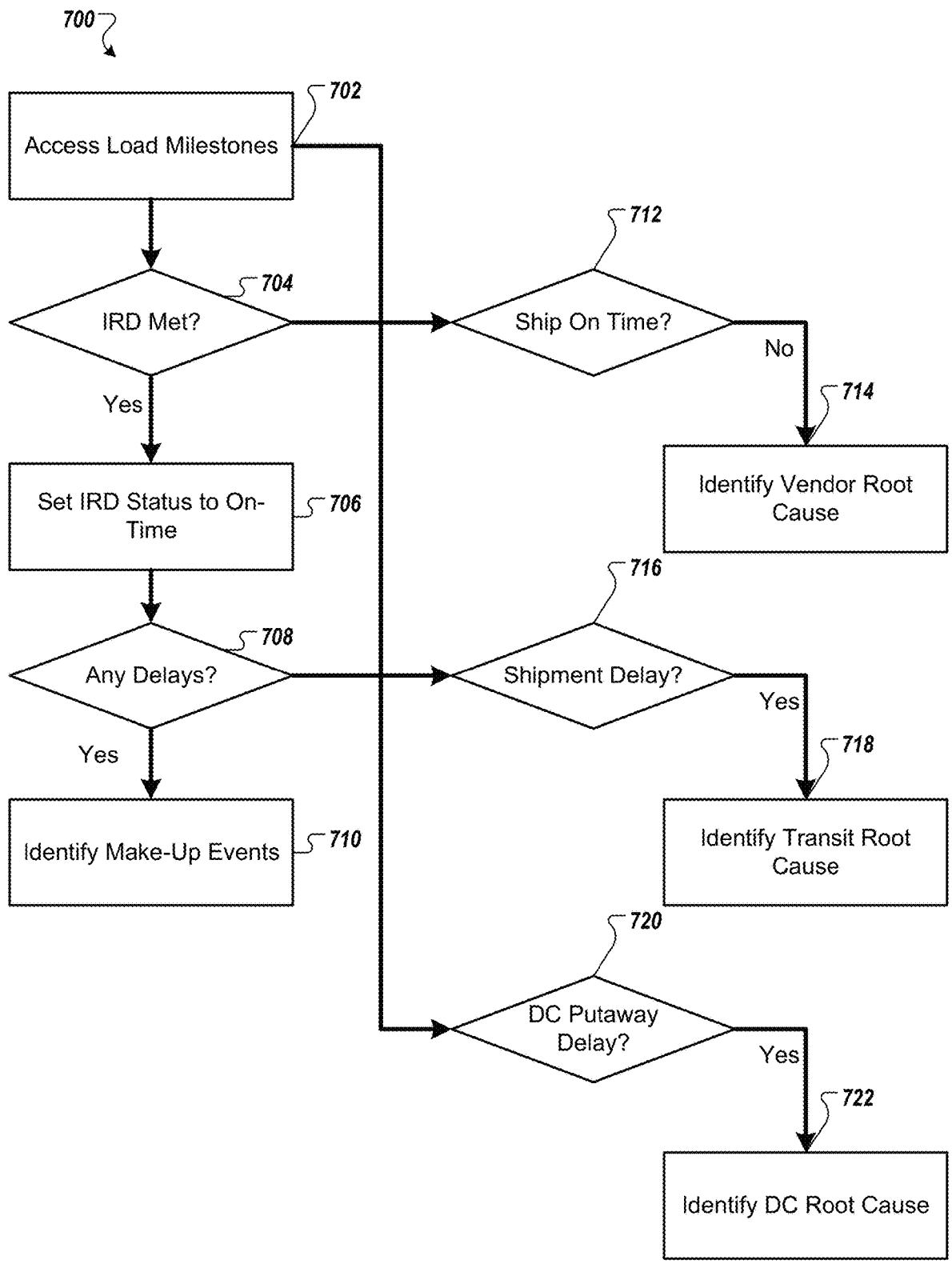
FIG. 7 shows a flowchart of a process for performing root-cause analysis of a load in a supply chain.

Queries for supply chain data are responded to 616. For example, clients can query the tracking system 502 to receive data related to the load data FIG. 7 shows a flowchart of a process 700 for performing root-cause analysis of a load in a supply chain. The process 700 can be performed by, for example, the system 500 using the root cause analyzer 528 and will be used as the basis of an example. Hover other elements may be used to perform the process 700 or other similar processes.

The process 700 shows operations that can be performed to determine root-causes of an IRD delay for a load, should there be one. For example, in the scenario where a vendor is late to provide a load, the shipper ships within a normal time frame, and the distribution center puts away the load in a normal time frame, the vendor can be identified as the root-cause of the delay, even though the shipper dropped off the load later than the original expected milestone specifies.

In some cases, a load that terminates with no IRD delay may or may not have an IRD delay root cause. Consider another example with a late vendor that is late by six hours, but with a shipper that makes up the six hours. The vendor may still be identified as a root-cause of the IRD delay, and the shipper may also be identified as a root-cause of the IRD catch up. As will be appreciated, this may be due to the shipper shipping faster than expected, which can happen when traffic is light, no mechanical delays are encountered, etc. Or this may be due to the supply chain issuing corrective actions, with one of those corrective actions being paying for better (i.e. faster) service from the shipper, prioritizing the shipper's load on a private road used to access the destination's receiving dock, etc.

In some cases, the process 700 can be used by the root cause analyzer 528 to determine the inventory readiness root cause for the particular load based on the disposition of the particular load, which can include determining that the inventory readiness metric of the particular load is behind-schedule based on a comparison a most-recent actual milestone and a corresponding expected milestone, determining that an early actual milestone did not match a corresponding earlier expected milestone; and determining that the supply-chain entity tasked with the corresponding earlier expected milestone is at least partly responsible for the inventory readiness root cause.

In some cases, the process 700 can be used by the root cause analyzer 528 to determine the inventory readiness root cause for the particular load based on the disposition of the particular load, which can include determining that the inventory readiness metric of the particular load is on-time based on a comparison a most-recent actual milestone and a corresponding expected milestone; determining that an early actual milestone did not match a corresponding earlier expected milestone; and determining that the supply-chain entity tasked with the corresponding earlier expected milestone is at least partly responsible for the inventory readiness root cause.

In some cases, the process 700 can be used by the root cause analyzer 528 to determine that the inventory readiness root cause for the particular load based on the disposition of the particular load comprises determining that a second supply-chain entity is responsible for returning the load's inventory readiness metric to on-time.

In some cases, the process 700 can be used by the root cause analyzer 528 to determine that the inventory readiness root cause for the particular load based on the disposition of the particular load comprises determining that a third supply-chain entity is also at least partly responsible for the inventory readiness root cause.

Load milestones are accessed 702. For example, the root cause analyzer 528 can access the expected milestones and the actual milestones for a particular load. If the most recent actual milestone is on time or early, the root cause analyzer 528 can determine that the IRD has been, or is being, met 704. If the IRD is met, the root cause analyzer 528 can set the IRD status to on time 706. With an on-time IRD status as on time, the root cause analyzer 528 can determine if there were delays in the hauling of the load 708, even though the IRD was met. In such a case, the root cause analyzer 528 can identify one or more make-up events 710 in which a particular supply chain entity performed faster than expected. In such cases, the root cause analyzer 528 can specify in load data which supply chain entity is credited with the make-up event. Example make up events can include, but are not limited to, reprioritizing a trailer or other logistic unit, requesting a higher service level from a service provider, skipping an intermediate location like a deconsolidator. In some cases, a late item or group of items can be paired logically with an early item or group of items, and the make-up event may be designed to slow down the early items and speed up the late items. In this way, the supply chain can be advantageously managed in a way that lowers overall variance by reducing both early and late items.

The root cause analyzer 528 can also examine the load data to determine if any of the supply chain entities are responsible for a delay, even if the IRD is ultimately met or not. For example, the root cause analyzer 528 can determine if a vendor ships on time 712 and if not, identify the vendor as a root-cause. The root cause analyzer 528 can determine if a transit entity caused a shipment delay 716, and if so, identify the transit entity as a root cause 718. The root cause analyzer 528 can determine if a distribution center incurred a putaway delay 720, and if so, identify the distribution center as a root cause. As will be understood, for a supply chain with different entities (e.g., an importer tasked with moving a load through customs), the root cause analyzer 528 can perform different tests (e.g., determine if the load was delayed in customs) to identify a root cause (e.g., that being the importer, in this case). In some cases, a single party may be identified as the dominant root cause. For example, the dominant root cause may be assigned to the last party to cause an item to be late, the party with the largest contribution to lateness, etc.

Figure 8:
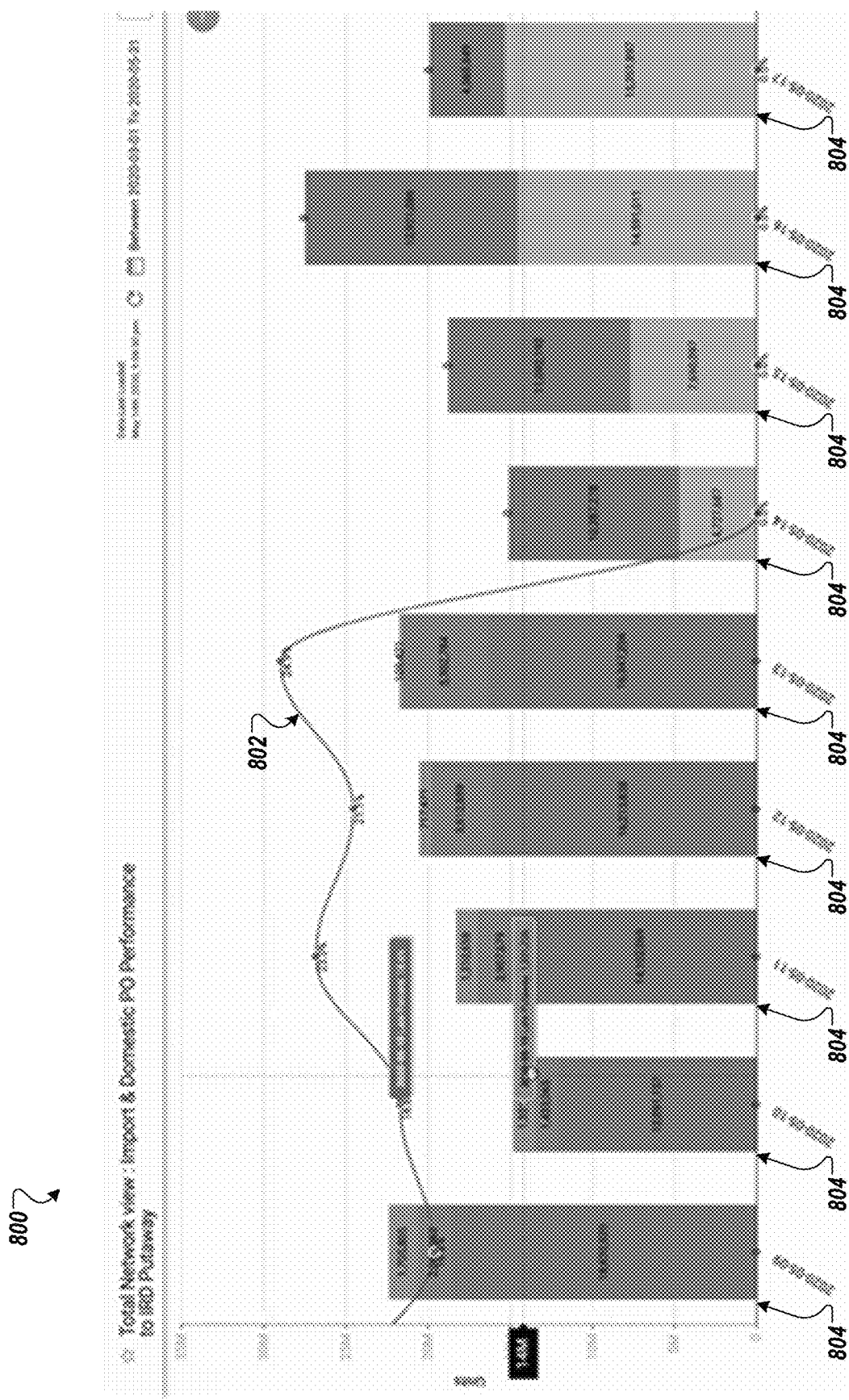
FIG. 8 shows a graphic user interface (GUI) for displaying historic and prospective IRD risk along with root-cause summaries.

FIG. 8 shows a GUI 800 for displaying historic and prospective IRD risk along with root-cause summaries. The GUI 800 can be displayed, for example, the GUI 800 can be served as a webpages by the tracking system 502, provided as a dedicated interface for an application installed on a device, or provided another way.

The GUI 800 shows historic and/or prospective IRD information. For example, line 802 can show a percent of past loads that were late and risk of future loads being early, or another appropriate metric. As will be understood, this example actual missed IRDs are shown, and the GUI is presented on a date of May 13, 2020. As dates after this time are prospective, and actually missed IRDs are shown at zero percent. However, a different line showing IRD risk might show positive values on prospective dates.

The GUI 800 can also provide information reflecting how distribution centers handle the loads with late IRD. Bars 804 show, for each day, a count of at-risk or missed IRDs based on the length of the bar 804. Sections of the bar 804 show how items with late IRDs are handled, with a second of the bar for late arrivals that have been put away as of the May 13, 2020 date, late arrivals waiting to be put away, late arrivals not-yet reaching the distribution center, etc.

Figure 9:
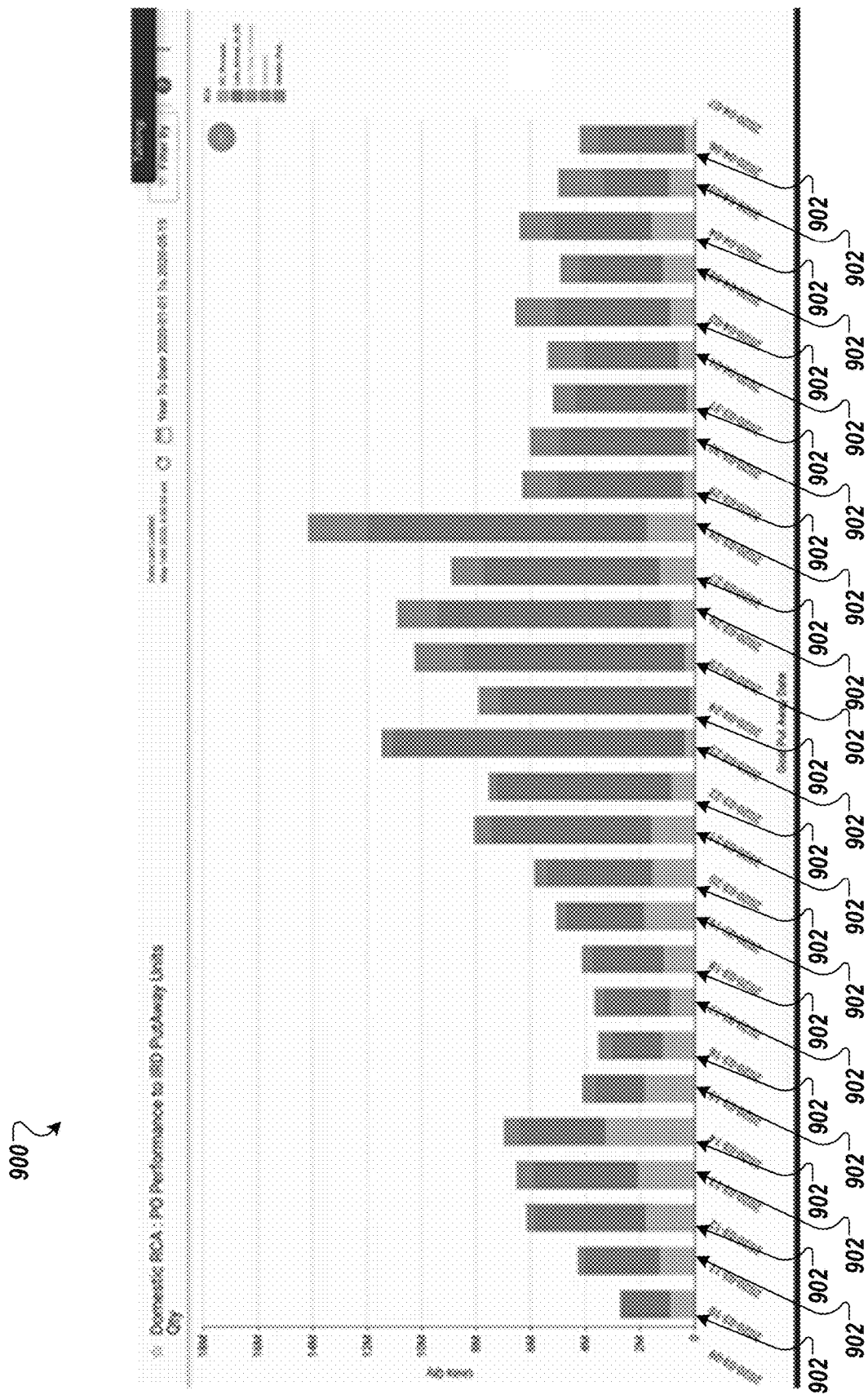
FIG. 9 shows a GUI for displaying root-causes of IRD misses based on cause classification.

FIG. 9 shows a GUI for displaying root-causes of IRD misses based on cause classification. The GUI 900 can be displayed, for example, the GUI 900 can be served as a webpages by the tracking system 502, provided as a dedicated interface for an application installed on a device, or provided another way.

The GUI 900 can be used to show counts of historic orders with loads that miss their IRD, and to show assignment of root cause for each. Bars 902 show, for each day, a number of late loads based on the length of the bar. Sections of the bar 902 show what portion of the late loads have root causes assigned to various supply chain entities (e.g., vendor, shipper, distribution center).

As shown here, the between the dates Mar. 20, 2020 and Apr. 3, 2020, IRD delays increased, with most of the increase being assigned to shippers. This information may be paired, for example, with external conditions (e.g., weather records) to determine if an external conditions forced the shippers to be slow, or if there was valid cause for the delay, or if the shippers bear responsibility without cause.

Figure 10:
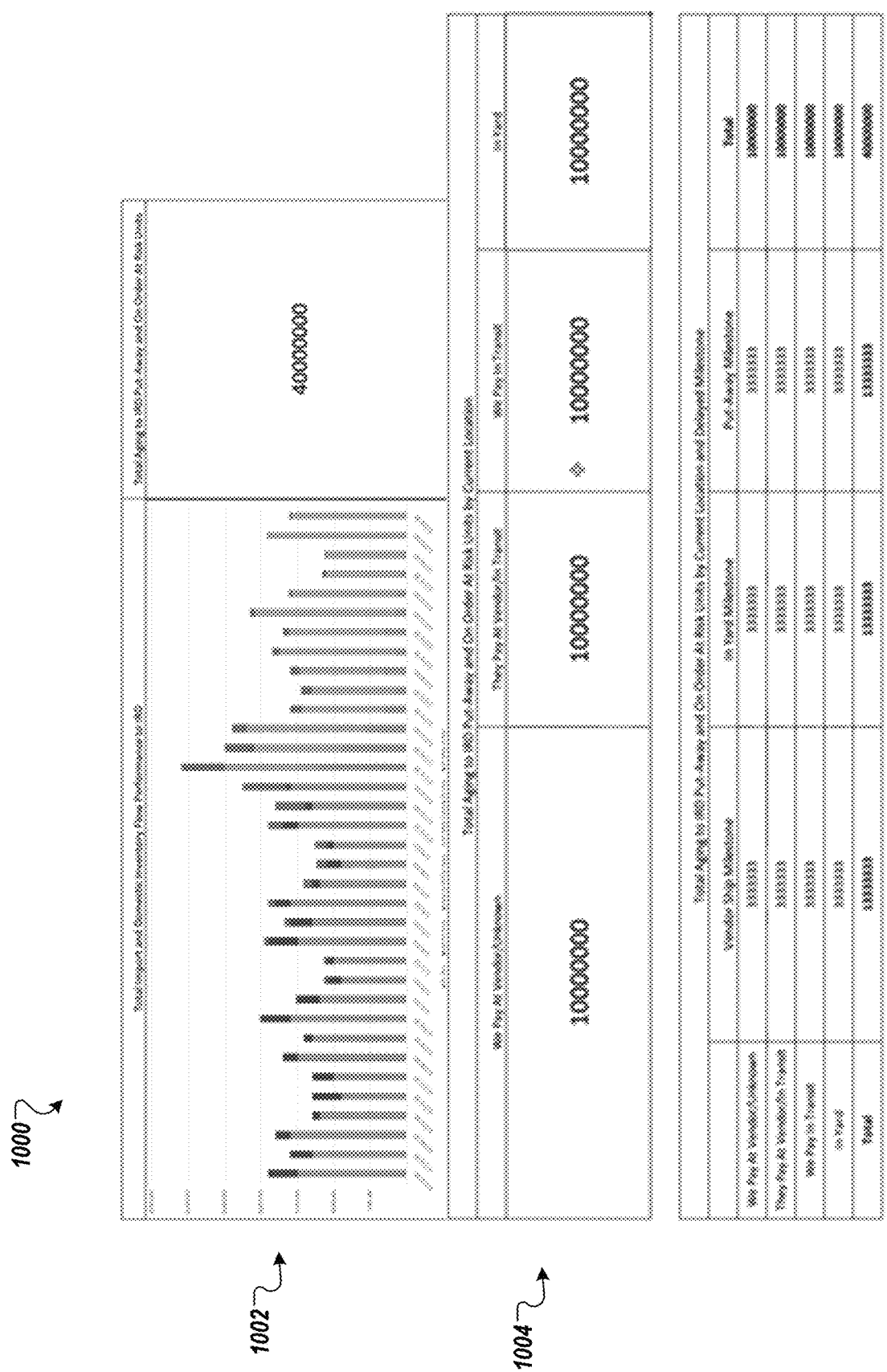
FIG. 10 shows a GUI for displaying details of IRD root cause data.

FIG. 10 shows a GUI for displaying details of IRD root cause data. The GUI 1000 can be displayed, for example, the GUI 900 can be served as a webpages by the tracking system 502, provided as a dedicated interface for an application installed on a device, or provided another way.

The GUI 1000 can be used to show historic and/or prospective IRD information. For example, bar graph 1002 can show, for each day, proportions of loads with various IRD status (e.g., ahead of schedule, on time, late, critically late). Tables 1004 can show, for example, financial impacts the various supply chain entities due to IRDs that are missed or expected to be missed, as the various entities have been assigned root causes for the various IRDs misses.

Figure 11:
FIG. 11 shows a GUI of root-cause assignment.

FIG. 11 shows a GUI 1100 of root-cause assignment. The GUI 1100 can be served as a webpages by the tracking system 502, provided as a dedicated interface for an application installed on a device, or provided another way.

The GUI 1100 can display to the user controls that show the current root-cause allocation scheme, and can receive input from the user to alter the scheme. For example, a user may click on a box to change from one glyph (e.g., a check mark) to another glyph (e.g., an X) to change the scheme.

Figure 12:
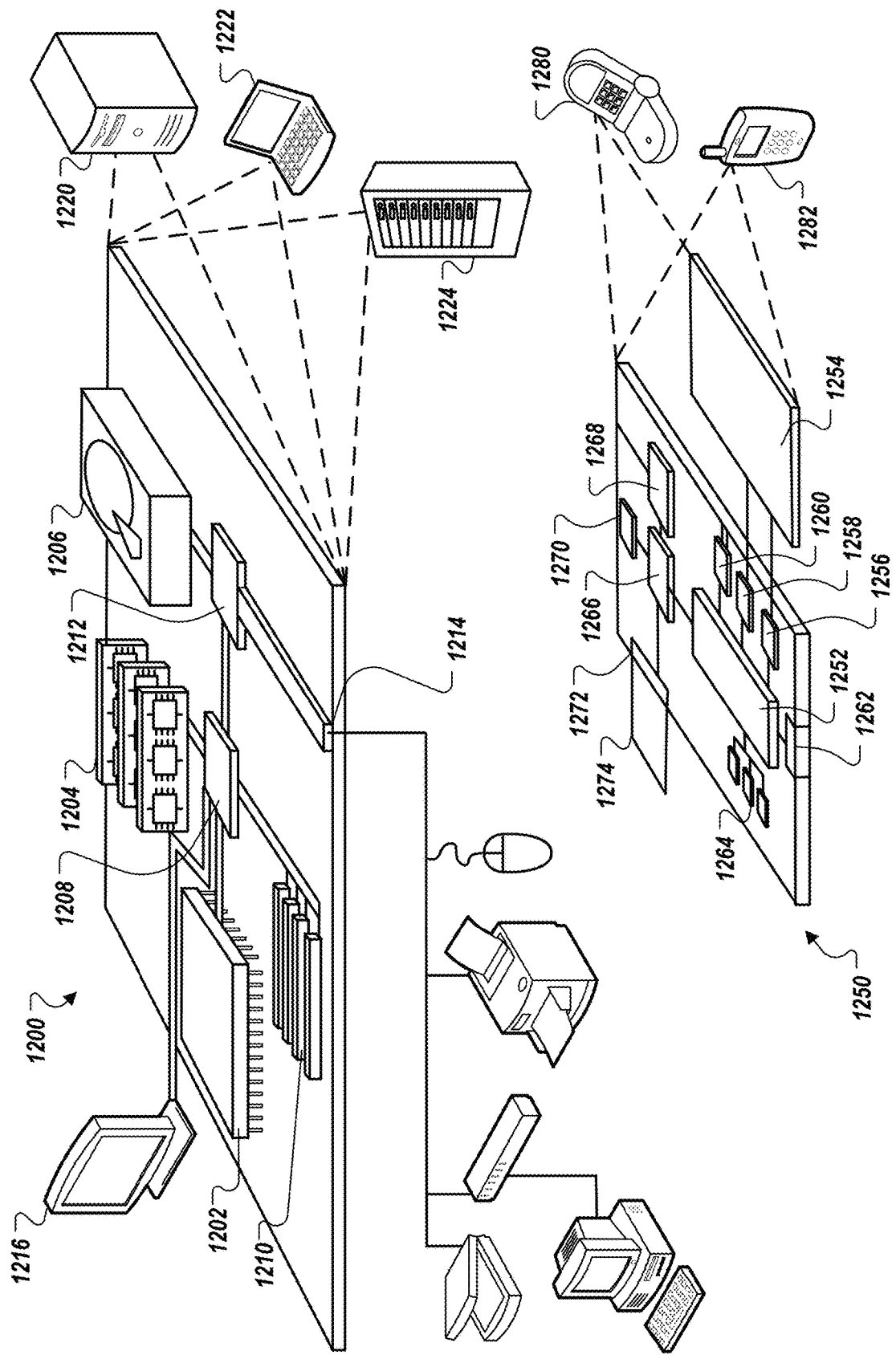
FIG. 12 is a schematic diagram that shows an example of a computing device and a mobile computing device.

FIG. 12 shows an example of a computing device 1200 and an example of a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the computing device 1200. In some implementations, the storage device 1206 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In the implementation, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1200 can be implemented in a number of different forms, as shown in the figure. For example, it can be implemented as a standard server 1220, or multiple times in a group of such servers. In addition, it can be implemented in a personal computer such as a laptop computer 1222. It can also be implemented as part of a rack server system 1224. Alternatively, components from the computing device 1200 can be combined with other components in a mobile device (not shown), such as a mobile computing device 1250. Each of such devices can contain one or more of the computing device 1200 and the mobile computing device 1250, and an entire system can be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 can also be provided with a storage device, such as a micro-drive or other device, to provide additional storage. Each of the processor 1252, the memory 1264, the display 1254, the communication interface 1266, and the transceiver 1268, are interconnected using various buses, and several of the components can be mounted on a common motherboard or in other manners as appropriate.

The processor 1252 can execute instructions within the mobile computing device 1250, including instructions stored in the memory 1264. The processor 1252 can be implemented as a chipset of chips that include separate and multiple analog and digital processors. The processor 1252 can provide, for example, for coordination of the other components of the mobile computing device 1250, such as control of user interfaces, applications run by the mobile computing device 1250, and wireless communication by the mobile computing device 1250.

The processor 1252 can communicate with a user through a control interface 1258 and a display interface 1256 coupled to the display 1254. The display 1254 can be, for example, a TFT (Thin-Film-Transistor Liquid Crystal Display) display or an OLED (Organic Light Emitting Diode) display, or other appropriate display technology. The display interface 1256 can comprise appropriate circuitry for driving the display 1254 to present graphical and other information to a user. The control interface 1258 can receive commands from a user and convert them for submission to the processor 1252. In addition, an external interface 1262 can provide communication with the processor 1252, so as to enable near area communication of the mobile computing device 1250 with other devices. The external interface 1262 can provide, for example, for wired communication in some implementations, or for wireless communication in other implementations, and multiple interfaces can also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 can also be provided and connected to the mobile computing device 1250 through an expansion interface 1272, which can include, for example, a SIMM (Single In Line Memory Module) card interface. The expansion memory 1274 can provide extra storage space for the mobile computing device 1250, or can also store applications or other information for the mobile computing device 1250. Specifically, the expansion memory 1274 can include instructions to carry out or supplement the processes described above, and can include secure information also. Thus, for example, the expansion memory 1274 can be provide as a security module for the mobile computing device 1250, and can be programmed with instructions that permit secure use of the mobile computing device 1250. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1264, the expansion memory 1274, or memory on the processor 1252. In some implementations, the computer program product can be received in a propagated signal, for example, over the transceiver 1268 or the external interface 1262.

The mobile computing device 1250 can communicate wirelessly through the communication interface 1266, which can include digital signal processing circuitry where necessary. The communication interface 1266 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1268 using a radio-frequency. In addition, short-range communication can occur, such as using a Bluetooth, WiFi, or other such transceiver (not shown). In addition, a GPS (Global Positioning System) receiver module 1270 can provide additional navigation- and location-related wireless data to the mobile computing device 1250, which can be used as appropriate by applications running on the mobile computing device 1250.

The mobile computing device 1250 can also communicate audibly using an audio codec 1260, which can receive spoken information from a user and convert it to usable digital information. The audio codec 1260 can likewise generate audible sound for a user, such as through a speaker, e.g., in a handset of the mobile computing device 1250. Such sound can include sound from voice telephone calls, can include recorded sound (e.g., voice messages, music files, etc.) and can also include sound generated by applications operating on the mobile computing device 1250.

The mobile computing device 1250 can be implemented in a number of different forms, as shown in the figure. For example, it can be implemented as a cellular telephone 1280. It can also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A system for the management of data, the system comprising:
   one or more processors; and
   computer-readable memory storing instructions that, when executed by the processors, cause the processors to perform operations comprising:
   for a load that has been transported in a supply chain from a source location to a destination location, accessing disposition information of the load, wherein the disposition comprising information pertains to a plurality of sequential milestone events that had been planned to occur for the load between the source location and the destination location, with the milestone events comprising arrival events that occur when the load arrives at a location and departure events that occur when the load departs from a location, with each milestone event being associated with (i) an expected milestone that specifies a date on which the milestone event has been planned to occur, (ii) an actual milestone that specifies a date on which the milestone event actually occurred, according to tracking data that was generated in response to detection of at least one identification tag of at least one container being transported by the load, and (iii) a supply chain entity that was tasked with fulfilling the milestone event, with at least two of the milestone events being associated with different supply chain entities;
   determining an inventory readiness date delay root cause for the load based on the disposition information of the load, by (i) determining, in a sequential order of milestone events, whether an actual milestone occurred after an expected milestone for the milestone event, and (ii) in response to determining that the actual milestone occurred after the expected milestone for the milestone event, attributing a supply chain entity that is associated with the milestone event as the inventory readiness date delay root cause for the load;
   storing load data for the load in a supply chain data store, along with load data for other transported loads, the load data comprising at least a portion of the disposition information of the load, and the inventory readiness date delay root cause for the load; and
   in response to a query about the supply chain, providing a graphical user interface that presents a visual comparison of a proportion of late loads to which each different supply chain entity has been attributed as the inventory readiness date delay root cause, using the load data.

2. The system of claim 1, the operations further comprising determining an inventory readiness metric for the load based on the disposition information of the load, by comparing the expected milestones for the load against the actual milestones for the load.

3. The system of claim 1, wherein the supply chain entity that was tasked with fulfilling the projected milestone event is a vendor, a shipper, or a distribution center.

4. The system of claim 2, wherein determining the inventory readiness date delay root cause for the load based on the disposition information of the load comprises:
   determining that the inventory readiness metric of the load is behind-schedule based on a comparison a most-recent actual milestone and a corresponding expected milestone;
   determining that an early actual milestone did not match a corresponding earlier expected milestone; and
   determining that the supply chain entity tasked with the corresponding earlier expected milestone is at least partly responsible for the inventory readiness date delay root cause.

5. The system of claim 2, wherein determining the inventory readiness date delay root cause for the load based on the disposition information of the load comprises:
   determining that the inventory readiness metric of the load is on-time based on a comparison a most-recent actual milestone and a corresponding expected milestone;
   determining that an early actual milestone did not match a corresponding earlier expected milestone; and
   determining that the supply chain entity tasked with the corresponding earlier expected milestone is at least partly responsible for the inventory readiness date delay root cause.

6. The system of claim 2, wherein determining the inventory readiness date delay root cause for the load based on the disposition information of the load comprises determining that a second supply-chain entity is responsible for returning the load's inventory readiness metric to on-time.

7. The system of claim 2, wherein determining the inventory readiness date delay root cause for the load based on the disposition information of the load comprises determining that a third supply-chain entity is also at least partly responsible for the inventory readiness date delay root cause.

8. A method of managing data, the method comprising:
for a load that has been transported in a supply chain from a source location to a destination location, accessing disposition information of the load, wherein the disposition information pertains to a plurality of sequential milestone events that had been planned to occur for the load between the source location and the destination location, with the milestone events comprising arrival events that occur when the load arrives at a location and departure events that occur when the load departs from a location, with each milestone event being associated with (i) an expected milestone that specifies a date on which the milestone event has been planned to occur, (ii) an actual milestone that specifies a date on which the milestone event actually occurred, according to tracking data that was generated in response to detection of at least one identification tag of at least one container being transported by the load, and (iii) a supply chain entity that was tasked with fulfilling the milestone event, with at least two of the milestone events being associated with different supply chain entities;
determining an inventory readiness date delay root cause for the load based on the disposition information of the load, by (i) determining, in a sequential order of milestone events, whether an actual milestone occurred after an expected milestone for the milestone event, and (ii) in response to determining that the actual milestone occurred after the expected milestone for the milestone event, attributing a supply chain entity that is associated with the milestone event as the inventory readiness date delay root cause for the load;
storing load data for the load in a supply chain data store, along with load data for other transported loads, the load data comprising at least a portion of the disposition information of the load, and the inventory readiness date delay root cause for the load; and
in response to a query about the supply chain, providing a graphical user interface that presents a visual comparison of a proportion of late loads to which each different supply chain entity has been attributed as the inventory readiness date delay root cause, using the load data.

9. The method of claim 8, further comprising determining an inventory readiness metric for the load based on the disposition information of the load, by comparing the expected milestones for the load against the actual milestones for the load.

10. The method of claim 8, wherein the supply chain entity that was tasked with fulfilling the milestone event is a vendor, a shipper, or a distribution center.

11. The method of claim 9, wherein determining the inventory readiness date delay root cause for the load based on the disposition information of the load comprises:
determining that the inventory readiness metric of the load is behind-schedule based on a comparison a most-recent actual milestone and a corresponding expected milestone;
determining that an early actual milestone did not match a corresponding earlier expected milestone; and
determining that the supply chain entity tasked with the corresponding earlier expected milestone is at least partly responsible for the inventory readiness date delay root cause.

12. The method of claim 9, wherein determining the inventory readiness date delay root cause for the load based on the disposition information of the load comprises:
determining that the inventory readiness metric of the load is on-time based on a comparison a most-recent actual milestone and a corresponding expected milestone;
determining that an early actual milestone did not match a corresponding earlier expected milestone; and
determining that the supply chain entity tasked with the corresponding earlier expected milestone is at least partly responsible for the inventory readiness date delay root cause.

13. The method of claim 9, wherein determining the inventory readiness date delay root cause for the load based on the disposition information of the load comprises determining that a second supply-chain entity is responsible for returning the load's inventory readiness metric to on-time.

14. The method of claim 9, wherein determining that the inventory readiness date delay root cause for the load based on the disposition information of the load comprises determining that a third supply-chain entity is also at least partly responsible for the inventory readiness date delay root cause.

15. A non-transitory computer-readable media storing instructions that, when executed by one or more processors, cause the processors to perform operations comprising:
for a load that has been transported in a supply chain from a source location to a destination location, accessing disposition information of the load, wherein the disposition information pertains to a plurality of sequential milestone events that had been planned to occur for the load between the source location and the destination location, with the milestone events comprising arrival events that occur when the load arrives at a location and departure events that occur when the load departs from a location, with each milestone event being associated with (i) an expected milestone that specifies a date on which the milestone event has been planned to occur, (ii) an actual milestone that specifies a date on which the milestone event actually occurred, according to tracking data that was generated in response to detection of at least one identification tag of at least one container being transported by the load, and (iii) a supply chain entity that was tasked with fulfilling the milestone event, with at least two of the milestone events being associated with different supply chain entities;
determining an inventory readiness date delay root cause for the load based on the disposition information of the load, by (i) determining, in a sequential order of milestone events, whether an actual milestone occurred after an expected milestone for the milestone event, and (ii) in response to determining that the actual milestone occurred after the expected milestone for the milestone event, attributing a supply chain entity that is associated with the milestone event as the inventory readiness date delay root cause for the load;
storing load data for the load in a supply chain data store, along with load data for other transported loads, the load data comprising at least a portion of the disposition information of the load, and the inventory readiness date delay root cause for the load; and in response to a query about the supply chain, providing a graphical user interface that presents a visual comparison of a proportion of late loads to which each different supply chain entity has been attributed as the inventory readiness date delay root cause, using the load data.

16. The media of claim 15, the operations further comprising determining an inventory readiness metric for the load based on the disposition information of the load, by comparing the expected milestones for the load against the actual milestones for the load.

17. The media of claim 15, wherein the supply chain entity that was tasked with fulfilling the milestone event is a vendor, a shipper, or a distribution center.

18. The media of claim 16, wherein determining the inventory readiness date delay root cause for the load based on the disposition information of the load comprises:
  determining that the inventory readiness metric of the load is behind-schedule based on a comparison a most-recent actual milestone and a corresponding expected milestone;
  determining that an early actual milestone did not match a corresponding earlier expected milestone; and
  determining that the supply chain entity tasked with the corresponding earlier expected milestone is at least partly responsible for the inventory readiness date delay root cause.

19. The media of claim 16, wherein determining the inventory readiness date delay root cause for the load based on the disposition information of the load comprises:
  determining that the inventory readiness metric of the load is on-time based on a comparison a most-recent actual milestone and a corresponding expected milestone;
  determining that an early actual milestone did not match a corresponding earlier expected milestone; and
  determining that the supply chain entity tasked with the corresponding earlier expected milestone is at least partly responsible for the inventory readiness date delay root cause.

20. The media of claim 16, wherein determining the inventory readiness date delay root cause for the load based on the disposition information of the load comprises determining that a second supply-chain entity is responsible for returning the load's inventory readiness metric to on-time.

21. The media of claim 16, wherein determining that the inventory readiness date delay root cause for the load based on the disposition information of the load comprises determining that a third supply-chain entity is also at least partly responsible for the inventory readiness date delay root cause.

* * * * *